US011448262B2

(12) United States Patent
Krondorf et al.

(10) Patent No.: US 11,448,262 B2
(45) Date of Patent: Sep. 20, 2022

(54) CLUTCH AND METHOD FOR THE PRODUCTION THEREOF

(71) Applicant: KWD Kupplungswerk Dresden GmbH, Dresden (DE)

(72) Inventors: Martin Krondorf, Dresden (DE); Thomas Hähnel, Wilsdruff (DE)

(73) Assignee: KWD Kupplungswerk Dresden GmbH, Dresden (DE)

( * ) Notice: Subject to any disclaimer, the term of this patent is extended or adjusted under 35 U.S.C. 154(b) by 362 days.

(21) Appl. No.: 16/631,459

(22) PCT Filed: Jul. 12, 2018

(86) PCT No.: PCT/EP2018/068987
§ 371 (c)(1),
(2) Date: Jan. 16, 2020

(87) PCT Pub. No.: WO2019/016072
PCT Pub. Date: Jan. 24, 2019

(65) Prior Publication Data
US 2020/0208683 A1    Jul. 2, 2020

(51) Int. Cl.
*F16D 3/18* (2006.01)
*F16D 1/02* (2006.01)
*F16D 13/00* (2006.01)

(52) U.S. Cl.
CPC .............. *F16D 1/02* (2013.01); *F16D 3/185* (2013.01); *F16D 13/00* (2013.01); *Y10S 29/023* (2013.01); *Y10S 264/77* (2013.01); *Y10S 464/90* (2013.01); *Y10T 403/35* (2015.01); *Y10T 403/472* (2015.01); *Y10T 403/475* (2015.01)

(58) Field of Classification Search
CPC . F16D 1/02; F16D 3/185; F16D 13/00; Y10S 29/023; Y10S 264/77; Y10S 464/90; Y10T 403/35; Y10T 403/472; Y10T 403/475
USPC .......................................... 464/158; 264/262
See application file for complete search history.

(56) References Cited

U.S. PATENT DOCUMENTS 3,402,572 A * 9/1968 Theodorew ............. F16D 3/185
                                                464/900
7,861,431 B2 * 1/2011 Richter ..................... G01B 1/00

FOREIGN PATENT DOCUMENTS

| DE | 102005047305 A1 | 4/2007 |
| DE | 102007036001 A1 | 2/2009 |
| DE | 102008052760 A1 | 4/2010 |

(Continued)

*Primary Examiner* — Greg Binda
(74) *Attorney, Agent, or Firm* — Michael Soderman

(57) ABSTRACT

A clutch as used, for example, in vehicle drives, in particular rail vehicle drives. A clutch is specified, by way of which the electric contact between the drive side and the output side of the clutch is prevented reliably, and a simple and inexpensive method for the production thereof is also specified. The problem is solved by way of a clutch, at least consisting of a clutch half on the drive side and a clutch half on the output side, wherein at least one clutch half has at least two hollow cylinders which are arranged above one another and are arranged in a bore of the clutch half, wherein the second hollow cylinder consists of electrically insulating material, and wherein at least the first hollow cylinder, at least on its outer circumferential surface, and at least the inner circumferential surface of the bore have knurling at least in part.

18 Claims, 1 Drawing Sheet

(56) References Cited

FOREIGN PATENT DOCUMENTS

| | | |
|---|---|---|
| DE | 202013010678 U1 | 12/2013 |
| DE | 102013007126 A1 | 6/2014 |
| DE | 102014204590 A1 | 9/2015 |
| WO | 2016177394 A1 | 11/2016 |

* cited by examiner

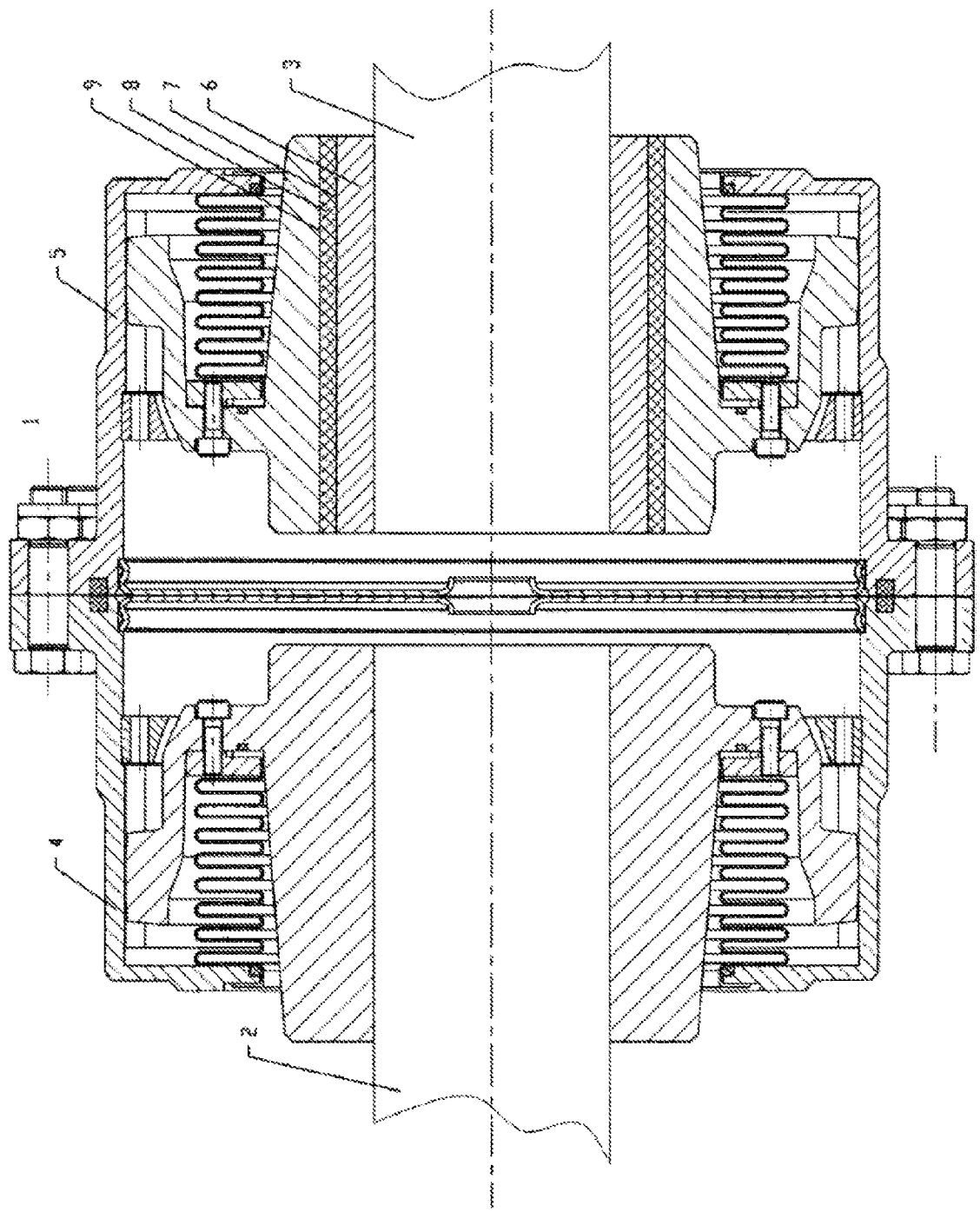

CLUTCH AND METHOD FOR THE PRODUCTION THEREOF

CROSS REFERENCE TO RELATED APPLICATIONS

This application is the U.S. national stage of International Application No. PCT/EP2018/068987, filed on 2018 Jul. 12. The international application claims the priority of DE 102017212604.3 filed on 2017 Jul. 21; all applications are incorporated by reference herein in their entirety.

BACKGROUND

The invention relates to the field of machine building and concerns a coupling, such as can be used for the transmission of a torque between two machine shafts, for example as a tooth coupling, flange coupling, disc coupling, plate coupling, all-metal coupling, diaphragm coupling, multi-plate coupling, friction clutch, or combination coupling, for example in vehicle drives, especially rail vehicle drives, as well as a method for its production.

Couplings are common knowledge in the prior art. They serve for transmitting of torques from one shaft to another. Such couplings may be rigid or elastic couplings, for example, or shiftable or non-shiftable couplings. Couplings also serve for a rigid, rotationally rigid, elastic, rotationally elastic and/or movable connection of two shafts, wherein torque surges and/or angle misalignments between the shafts can be compensated by the couplings.

Such couplings are used in the drive trains of vehicles, such as cars, trucks, commercial vehicles, buses, and also rail vehicles, among others. They are directly integrated in the driving connections between a drive unit, such as an engine, and a working machine, or they can be shifted into such a connection.

Besides the above indicated requirements which such couplings must satisfy, it is required of couplings that the individual components of the couplings be electrically insulated from each other. Thus, for example, in electrically powered rail vehicles it is necessary to interrupt the electrical contact between the wheel sets and the vehicle drive train, in order to prevent a voltage flashover. Such a voltage flashover must essentially be prevented in vehicles.

Various solutions are known for this, having a component for electrical insulation at least at one location of the vehicle drive train, in order to interrupt the electrical connection and specifically divert the voltage.

Thus, there is known from DE 10 2014 204 590 A1 a tooth coupling with a first coupling segment to be connected to the drive shaft and a second coupling segment to be connected to the output shaft, wherein at least one of the two coupling segments comprises driving teeth with an internal toothing and an intermeshing external toothing, and a middle tube of an electrically insulating material joining the two coupling segments together and electrically insulating them from each other. Such an electrically insulating material is advantageously a fiber-reinforced plastic.

Further, there is known from DE 20 2013 010 678 U1 a coupling in which the coupling hub is divided into a ring-shaped inner hub piece to receive at least one shaft component and a ring-shaped outer hub piece with an opening bounded by an inner surface, in which the inner hub piece is introduced, wherein the inner hub piece comprises an outer lateral surface which stands in connection with the inner surface of the outer hub piece, wherein an elastic insulating layer is located between the outer lateral surface of the inner hub piece and the inner surface of the outer hub piece, being applied to the insulation carrier(s) in the form of the inner hub piece and/or in the form of the outer hub piece prior to a further assembly. The insulation layer consists advantageously of a ceramic material and has a layer thickness which is substantially less than the thickness of the insulation layer carrier.

From DE 10 2007 036 001 A1 there is known an electrically insulating shaft connecting element, in which an outer shaft element with an inner opening, wherein an inner surface of the outer shaft element is formed in the inner opening, an inner shaft element with an outer surface of the inner shaft element, which outer surface is inserted into the inner opening of the outer shaft element by means of a press fit connection, the inner surface of the outer shaft element and/or the outer surface of the inner shaft element have an electrical insulation coating, which electrically insulates the outer shaft element and the inner shaft element from each other.

According to DE 10 2013 007 126 A1, a coupling is known for the transmitting of a torque as well as a vehicle drive train, especially for a rail vehicle. This coupling comprises a first coupling half, which can be connected to a drive, a second coupling half, which can be connected to a working machine, at least one of the coupling halves is divided into two, comprising a first part and a second part, the two parts being arranged with no contact between them, so that no current flow can occur between the two, the two parts together bounding a cavity, containing at least one electrically insulating body, the cavity and the body being configured and arranged such that a torque is transmitted during operation from one part to the other part.

One drawback of the solutions of the prior art is that the electrical contact is not broken to an adequate extent by the insulation layers for the electrical insulation between drive side and output side of a coupling so as to prevent a voltage flashover, because in particular the attainable capacitances of the insulation layers are too high.

A further drawback is that the insulation layers of couplings in the prior art often have only inhomogeneous layers and/or also nonuniform layer thicknesses, so that these locations are the areas with the least insulating effect and are determinative for the electrical properties of the overall coupling.

Another drawback is that the insulation layers of the prior art are often situated in direct proximity to the gearing, which is especially unfavorable because a thermal insulation occurs along with the desired electrical insulation, which may during operation result in significant reduction of the heat dissipation and thus result in higher coupling temperatures.

SUMMARY

The invention relates to a coupling, comprised of at least one coupling half on the drive side and one coupling half on the output side. At least one coupling half, starting from the drive shaft or output shaft and connected to it by form fit, force locking, and/or material bonding, is made up of at least two hollow cylinders which are arranged above one another and joined together by form fit, force locking, and/or material bonding, which are situated in a bore of the coupling half, which is arranged substantially parallel to the axis of rotation of the drive shaft or output shaft in the coupling half. The first hollow cylinder and the coupling half is made up of electrically conductive material at least in the region of the bore and the second hollow cylinder is made up of electrically insulating material, and at least the first hollow cylinder has at least partially a knurling at least on its outer lateral surface on the side facing away from the drive shaft or output shaft and at least the inner lateral surface of the bore has at least partially a knurling in the coupling half. The second hollow cylinder has a substantially complete and at least form fitting contact at least over the entire circumference with the outer lateral surface of the first hollow cylinder and the inner lateral surface of the bore in the coupling half.

DETAILED DESCRIPTION

The object of the present invention is to specify a coupling with which the electrical contact between drive side and output side of the coupling is reliably prevented, along with a simple and economical method for its production.

The object is solved by the invention as specified in the claims. Advantageous embodiments are the subject matter of the dependent claims.

The coupling according to the invention consists at least of one coupling half on the drive side and one coupling half on the output side, wherein at least one coupling half, starting from the drive shaft or output shaft and connected to it by form fit, force locking, and/or material bonding, comprises at least two hollow cylinders which are arranged above one another and joined together by form fit, force locking, and/or material bonding, which are situated in a bore of the coupling half, which is arranged substantially parallel to the axis of rotation of the drive shaft or output shaft in the coupling half, wherein the first hollow cylinder and the coupling half consists of electrically conductive material at least in the region of the bore and the second hollow cylinder consists of electrically insulating material, and wherein at least the first hollow cylinder has at least partially a knurling at least on its outer lateral surface on the side facing away from the drive shaft or output shaft and at least the inner lateral surface of the bore has at least partially a knurling in the coupling half, and wherein the second hollow cylinder has a substantially complete and at least form fitting contact at least over the entire circumference with the outer lateral surface of the first hollow cylinder and the inner lateral surface of the bore in the coupling half.

Advantageously, the coupling is a tooth coupling, a flexible link coupling, a flexible disc coupling, a flange coupling, a frictional clutch or a diaphragm coupling.

Likewise advantageously, the first hollow cylinder and the coupling half consist of a metallic material at least in the area of the bore.

Furthermore advantageously, the second hollow cylinder consists of an elastomer, duromer or thermoplastic, even more advantageously of epoxy resin, polyoxymethylene, polyether ether ketone, polyamide, polyurethane or fiberglass-reinforced plastics.

And also advantageously, the material of the second hollow cylinder has a dielectric constant or permittivity of at most 9.

It is also advantageous for the second hollow cylinder to have a wall thickness of at least 1 mm.

It is also advantageous for the form of the knurling on the lateral surfaces of the first hollow cylinder and the bore in the coupling half to be arranged substantially parallel to the axis of rotation of the drive shaft or output shaft.

It is furthermore advantageous for the form of the knurling on the lateral surfaces of the first hollow cylinder and the bore in the coupling half to be arranged at an angle between 0° and 90° to the axis of rotation of the drive shaft or output shaft. It is likewise advantageous for the coupling half and the two hollow cylinders to have a form fitting and force locking contact or a form fitting and material bonded contact or a form fitting, force locking and material bonded contact with each other and with the inner lateral surface of the bore.

It is also advantageous for the knurling at least over the entire circumference of the inner and outer lateral surface of the first hollow cylinder and inner lateral surface of the bore of the coupling half to be present partly or entirely over the entire height of the hollow cylinder and the bore.

It is furthermore advantageous for the knurling to be uniform on at least one lateral surface.

It is likewise advantageous for the second hollow cylinder to have a knurling partly or entirely on the inner and/or outer lateral surface.

And it is also advantageous for the inner lateral surface of the first hollow cylinder to correspond to the shape of the outer lateral surface of the drive shaft or output shaft and all other lateral surfaces of the first and second hollow cylinder and the bore respectively to correspond at least to the shape of the lateral surfaces in contact with them in order to create a force locking, form fitting or material bonded connection.

It is furthermore advantageous for the outer lateral surface of the first hollow cylinder, the inner and/or outer lateral surface of the second hollow cylinder and the inner lateral surface of the bore to have a conical or stepped shape and/or the diameter of the hollow cylinders and/or of the bore to be the same or different along its length and for the diameter to be round, ellipsoidal or polygonal and/or for the end faces of the second hollow cylinder to end at the end faces and/or the lateral surfaces of the first, inner hollow cylinder and coupling half with the bore and to realize the electrical insulation of the first hollow cylinder and coupling half.

In the method according to the invention for producing a coupling, at least two coupling halves are produced and at least one coupling half is made at least from two hollow cylinders arranged above one another, wherein at first the first, inner hollow cylinder and the coupling half are produced from an electrically conductive material, then a bore is introduced into the coupling half, realizing a substantially parallel arrangement of the coupling half to the axis of rotation of the drive shaft or output shaft, at least the outer lateral surface of the first, inner hollow cylinder and the inner lateral surface of the bore in the coupling half are provided with a knurling, and then the second, middle hollow cylinder made of an electrically insulating material is introduced into the space between the inner hollow cylinder and the bore in the coupling half with substantially complete and at least form fitting contact.

Advantageously, the knurling is introduced in the coupling half by means of knurling, pressing, thread cutting, lathe turning, milling or embossing on the lateral surfaces of the first hollow cylinder and the bore.

Likewise advantageously, the electrically insulating material of the second hollow cylinder is introduced in a solid, pastelike, liquid or molten form.

Further advantageously, a polymer material such as an elastomer, a duromer or a thermoplastic is introduced as the electrically insulating material of the second hollow cylinder.

And also advantageously, the material of the second hollow cylinder is press-fitted or injected into the space between the inner hollow cylinder and the bore in the coupling half.

With the present invention, a coupling is specified with which the electrical contact between drive side and output side of the coupling is reliably prevented, along with a simple and economical method for its production.

This is accomplished by a coupling which consists at least of one coupling half on the drive side and one coupling half on the output side. Such a coupling may advantageously be a tooth coupling, a disc coupling, a plate coupling, a flange coupling, a diaphragm coupling or a combination coupling.

At least one coupling half comprises at least two hollow cylinders arranged above one another and joined together in form fitting, force locking, and/or material bonded manner, starting from the drive shaft or output shaft and connected to the latter in form fitting, force locking and/or material bonded manner.

By a hollow cylinder is meant in the context of the present invention basically a straight circular cylinder, having a bore along its axis.

The lateral surfaces of the hollow cylinders may have different configurations in their external shape. The inner and/or outer lateral surfaces of the hollow cylinders may have for example a conical or stepped shape and also the inner and/or outer diameters of the hollow cylinders may be the same size or different size along their length, and likewise the shape of the diameter may be round, ellipsoidal or polygonal and vary along the length of the hollow cylinders.

It is further possible for the second hollow cylinder to realize the electrical insulation from the inner, first hollow cylinder and coupling half not only at the end face, but also in the area of the lateral surfaces, i.e., to be present in an angled form for example, so that the outer lateral surface of the coupling half comprises in part the material of the coupling half, the material of the second hollow cylinder and the material of the first, inner hollow cylinder.

Regardless of the shape, wall thickness, and material of the second hollow cylinder, according to the invention a complete electrical insulation must be realized for the first, inner hollow cylinder and the coupling half with the bore.

All that is defined is the shape of the inner lateral surface of the first inner cylinder, which must correspond to the shape of the drive shaft or output shaft in the area where they are joined together in form fitting, force locking and/or material bonded manner.

The two hollow cylinders are arranged directly above one another, so that the first, inner hollow cylinder has the smallest inner diameter, corresponding to the diameter of the drive shaft or output shaft. The second, middle hollow cylinder has an inner diameter which corresponds to the outer diameter of the first, inner hollow cylinder.

The middle, second hollow cylinder is arranged in a bore of the coupling half, which is situated substantially parallel to the axis of rotation of the drive shaft or output shaft in the coupling half.

The outer diameter of the second, middle hollow cylinder corresponds to the inner diameter of the bore.

Further, the first hollow cylinder and the coupling half consist of an electrically conductive material at least in the area of the bore and the second hollow cylinder consists of electrically insulating material.

A metallic material is substantially present as the electrically conductive material. Polymer materials, such as elastomers, duromers and/or thermoplastics are present as the electrically insulating material. Such polymer materials advantageously consist of epoxy resin, polyoxymethylene (POM), polyether ether ketone (PEEK), polyamide (PA), polyurethane (PU) or they are fiberglass-reinforced plastics.

Further, at least the first hollow cylinder has at least partly a knurling at least on its outer lateral surface, on the side facing away from the drive shaft or output shaft, and at least the bore likewise has at least partly a knurling on its inner lateral surface, facing toward the drive shaft or output shaft.

By a knurling is meant in the context of the present invention an encircling departure from the shape of the surface produced by means of knurling, pressing, thread cutting, lathe turning, milling or embossing, being impressed into a metallic body of revolution.

The shape of the knurling on the lateral surfaces of the first hollow cylinder and the bore is arranged advantageously substantially parallel or at an angle between 0° and 90° to the axis of rotation of the drive shaft or output shaft. Likewise advantageously, the knurling is present at least over the entire circumference of the outer lateral surface of the first hollow cylinder and the inner lateral surface of the bore, partly or entirely over the entire height of the hollow cylinder and the bore.

A uniform knurling on a lateral surface is also advantageous.

It may also be advantageous for the second hollow cylinder to also have a knurling entirely or partly on the inner and/or outer lateral surface.

Moreover, the second hollow cylinder has a substantially complete at least form fitting contact at least over the entire circumference with the outer lateral surface of the first and the inner lateral surface of the bore. The two hollow cylinders advantageously have a form fitting and force locking contact with each other and also with the bore, or a form fitting and material bonded contact or a form fitting, force locking, and material bonded contact.

In any case, it must be assured that the transmission of a torque between the two shafts is realized by the coupling and also by the connection of the two hollow cylinders to each other and to the coupling half via the bore, and also to the shaft.

By force locking is meant in the context of the present invention a force locking connection in which a normal force is exerted on the surfaces being joined and a mutual shifting of the surfaces being joined is prevented by virtue of friction.

By form fitting is meant in the context of the present invention a form fitted connection in which the mechanical intermeshing of at least two connection partners makes possible a transmission of force by virtue of a geometrically exact fit of the connection partners. A separation of the connection partners cannot occur even in the absence of, or in the event of an interruption of, a transmission of force.

By material bonding is meant in the context of the present invention a material bonded connection in which the connection partners are held together by atomic or molecular forces, whereby the material bonded connection is an inseparable connection which can only be broken by destroying the means of connection.

Further, it is advantageous to select the electrically insulating material with a dielectric constant or a permittivity of at most 9.

The electrical capacitance between two electrically conductive bodies insulated from each other is determined by the dielectric constant of the insulating medium as well as the geometry of the electrically conductive bodies.

The permittivity $\varepsilon$, also called the dielectric conductivity or dielectric function, indicates in electrodynamics and also in electrostatics the permeability of a particular material to electric fields.

If the wall thickness of the second, middle hollow body is too small, a capacitance of the electrically conductive hollow cylinder and the coupling half low enough to reliably prevent an electrical contact between drive side and output side of the coupling and a voltage flashover is not attained.

Furthermore, the electrical resistance of the electrically insulating material prevents a flow of current. The electrical resistance in electrical engineering is a measure of the electrical voltage which is needed to allow a particular electric current strength to flow through an electrical conductor (component, circuit). In the case of the solution according to the invention, the specific volume resistance in regard to the electrically insulating material should be $>1*10^{10}$ Ωcm.

According to the invention, the coupling according to the invention is produced by a method in which at least two coupling halves are produced and at least one coupling half is made from at least two hollow cylinders arranged above one another in a bore of a coupling half.

At first, the first, inner hollow cylinder and the second coupling half are produced from an electrically conductive material at least in the area of the bore.

At least the outer lateral surface of the first of the inner hollow cylinder and the inner lateral surface of the bore are then are provided with a knurling.

The knurling can be introduced advantageously by means of knurling, pressing, thread cutting, lathe turning, milling or embossing on the lateral surfaces of the first hollow cylinder and the bore.

After this, the second, middle hollow cylinder made of an electrically insulating material is introduced into the space between the inner hollow cylinder and the bore in the coupling half with substantially complete and at least form fitting contact.

A polymer material such as an elastomer, a duromer or a thermoplastic can be advantageously introduced as the electrically insulating material of the second hollow cylinder.

The electrically insulating material of the second hollow cylinder can be introduced in a solid, pastelike, liquid or molten form. This can be done advantageously by press fitting or by injecting.

A further benefit of the solutions according to the invention, especially in a tooth coupling, is that the arrangement of the electrical insulation realized thus far in the prior art is improved with the solution according to the invention.

What is more, thanks to the solution according to the invention no functionally required cavities are produced, which realizes a secure transmission of a torque between two machine shafts.

Moreover, the costly depositing of expensive ceramic or other electrically insulating layers on parts of the coupling can be avoided according to the invention and a uniform and even application of an electrically insulating material can be achieved according to the invention.

Furthermore, with the solution according to the invention there is the benefit that the hollow cylinders made of the electrically insulating material form very homogeneous layers and uniform layer thicknesses, so that the electrical properties of the overall coupling are identical and equally good in all places.

A further benefit of the solution according to the invention is that the hollow cylinder made of the electrically insulating material is positioned in a place within one or more coupling halves that does not impair other coupling parts either in their function or their effect. Thus, the hollow cylinder made of the electrically insulating material can also be arranged at appreciable distance from a gearing of a tooth coupling, for example, which is especially favorable in that, besides the desired electrical insulation, a thermal insulation is largely prevented, which does not hinder the heat dissipation and thus does not increase the coupling temperature.

The invention will be explained in more detail below using an exemplary embodiment.

BRIEF DESCRIPTION OF THE DRAWINGS

FIG. 1 shows a tooth coupling according to the invention,
FIG. 2 shows a flexible link coupling,
FIG. 3 shows a flexible disc coupling,
FIG. 4 shows a flange coupling,
FIG. 5 shows a frictional clutch,
FIG. 6 shows a diaphragm coupling, and
FIG. 7 shows a detailed view of knurling in the case of a flexible link coupling.

DETAILED DESCRIPTION OF THE PREFERRED EMBODIMENTS

Example 1

A tooth coupling 1, serving to connect a drive shaft and output shaft 2, 3. The drive shaft 2 may be for example an engine shaft and the output shaft 3 may be a transmission shaft for a vehicle. The tooth coupling 1 basically consists of two coupling halves 4, 5, one on the drive side 2 and the other on the output side 3.

The coupling half 4 on the drive side 2 is unchanged with respect to tooth couplings of the prior art. The coupling half 5 on the output side 3 has the design according to the invention.

The first, inner hollow cylinder 6 made of steel has an internal diameter corresponding to the external diameter of the output shaft 3.

The wall thickness of the first hollow cylinder 6 is 14 mm and the length is 65 mm. On the entire outer lateral surface of the first hollow cylinder 6 there is produced a knurling 7 in the form of ribs by means of knurling arranged parallel to the axis of rotation of the output shaft 3. The ribs arranged parallel to each other have a height of 0.6 mm and a mutual spacing of 0.6 mm.

Around the first hollow cylinder 6 there is arranged a bore of the coupling half 5 of the tooth coupling 1, being introduced in rotationally symmetrical manner with the output shaft 3 in the coupling half 5. The diameter of the bore is 5 mm larger than the external diameter of the first hollow cylinder 6.

The coupling half 5 in the area of the bore is likewise made of steel. The bore has a knurling 9 on its entire inner lateral surface, being in the form of ribs. The ribs are arranged parallel to each other and parallel to the axis of rotation of the output shaft 3.

The first hollow cylinder 6 is secured in the bore on a support, maintaining a distance of 5 mm all around, and in the space between the first hollow cylinder 6 and the bore there is injected a pastelike epoxy resin at a temperature of 120° C., entirely filling up the space. After the curing of the epoxy resin, any protruding pieces of the resin are removed. The hardened epoxy resin forms the second hollow cylinder 8. The wall thickness of the second hollow cylinder 8 is 5 mm. The dielectric constant of the epoxy resin is 4.3.

After this, further parts of the tooth coupling 1 are assembled and the coupling is completed.

The tooth coupling 1 according to the invention reliably prevents the electrical contact between drive side and the output side of the coupling, and it can be produced easily and economically.

Additional Items of Note:

The coupling 1 can be a tooth coupling (FIG. 1), a flexible link coupling (FIG. 2), a flexible disc coupling (FIG. 3), a flange coupling (FIG. 4), a frictional clutch (FIG. 5) or a diaphragm coupling (FIG. 6).

The form of the knurling 7 on the lateral surfaces of the first hollow cylinder 6 and the bore in the coupling half can be arranged at an angle between 0° and 90° to the axis of rotation of the drive shaft 2 or output shaft 3.

The coupling half and the two hollow cylinders 6, 7 can have a form fitting and force locking contact or a form fitting and material bonded contact or a form fitting, force locking and material bonded contact with each other and with the inner lateral surface of the bore.

The knurling at least over the entire circumference of the inner and outer lateral surface of the first hollow cylinder and inner lateral surface of the bore of the coupling half can be present partly or entirely over the entire height of the hollow cylinder and the bore.

The knurling can be uniform on at least one lateral surface.

The second hollow cylinder 8 can have knurling partly or entirely on the inner and/or outer lateral surface.

The inner lateral surface of the first hollow cylinder 6 can correspond to the shape of the outer lateral surface of the drive shaft 2 or output shaft 3 and all other lateral surfaces of the first 6 and second hollow cylinder 8 and the bore respectively can correspond at least to the shape of the lateral surfaces in contact with them in order to create a force locking, form fitting or material bonded connection.

The outer lateral surface of the first hollow cylinder 6, the inner and/or outer lateral surface of the second hollow cylinder 8 and the inner lateral surface of the bore can have a conical or stepped shape and/or the diameter of the hollow cylinders and/or of the bore can be the same or different along its length and the diameter can be round, ellipsoidal or polygonal and/or the end faces of the second hollow cylinder 8 can end at the end faces and/or the lateral surfaces of the first, inner hollow cylinder 6 and coupling half with the bore and can realize the electrical insulation of the first hollow cylinder 6 and coupling half.

The knurling can be introduced in the coupling half by means of knurling, pressing, thread cutting, lathe turning, milling or embossing on the lateral surfaces of the first hollow cylinder and the bore.

LIST OF REFERENCE NUMERALS

1 Coupling, tooth coupling, a flexible link coupling, a flexible disc coupling, a flange coupling, a frictional clutch or a diaphragm coupling
2 Drive shaft
3 Output shaft
4 First coupling half on the drive side
5 Second coupling half in the output side
6 First hollow cylinder
7 Knurling on the inner hollow cylinder, arranged substantially parallel to the axis of rotation of the drive shaft or output shaft, is arranged at an angle between 0° and 90° to the axis of rotation of the drive shaft or output shaft
8 Second hollow cylinder includes an elastomer, duromer or thermoplastic, advantageously of epoxy resin, polyoxymethylene, polyether ether ketone, polyimide, polyurethane or fiberglass-reinforced plastics
9 Knurling on the second hollow cylinder, arranged substantially parallel to the axis of rotation of the drive shaft or output shaft, is arranged at an angle between 0° and 90° to the axis of rotation of the drive shaft or output shaft

The invention claimed is:

1. Coupling (1) for rail vehicle drives, comprised of at least
a first coupling half (4) on a drive side and a second coupling half (5) on an output side,
wherein at least the second coupling half (5), starting from a drive shaft or an output shaft (2, 3) and connected to it by form fit, force locking, and/or material bonding, includes at least two hollow cylinders (6, 8) which are arranged above one another and joined together by form fit, force locking, and/or material bonding, which are situated in a bore of the second coupling half (5), which is arranged substantially parallel to the axis of rotation of the drive shaft or output shaft (2, 3) in the second coupling half (5),
wherein a first hollow cylinder (6) and the second coupling half (5) include electrically conductive material at least in the region of the bore and a second hollow cylinder (8) includes electrically insulating material, and
wherein at least the first hollow cylinder (6) has at least partially a knurling (7) at least on its outer lateral surface on a side facing away from the drive shaft or output shaft (2, 3) and at least the inner lateral surface of the bore has at least partially a knurling (9) in the second coupling half (5), and
wherein the second hollow cylinder (8) has a knurling (7, 9) partly or entirely on the inner and outer lateral surface, and wherein the second hollow cylinder (8) has a completely interlocking contact over the entire circumference between the outer lateral surface of the first hollow cylinder (6) and the inner lateral surface of the bore in the second coupling half (5).

2. Coupling according to claim 1,
in which the coupling (1) is a tooth coupling, a flexible link coupling, a flexible disc coupling, a flange coupling, a frictional clutch or a diaphragm coupling.

3. Coupling according to claim 1,
in which the first hollow cylinder (6) and the second coupling half (5) include a metallic material at least in the area of the bore.

4. Coupling according to claim 1,
in which the second hollow cylinder (8) includes an elastomer, duromer or thermoplastic, of epoxy resin, polyoxymethylene, polyether ether ketone, polyamide, polyurethane or fiberglass-reinforced plastics.

5. Coupling according to claim 1,
in which the material of the second hollow cylinder (8) has a dielectric constant or permittivity of at most 9.

6. Coupling according to claim 1,
in which the second hollow cylinder (8) has a wall thickness of at least 1 mm.

7. Coupling according to claim 1,
in which the form of the knurling (7, 9) on the lateral surfaces of the first hollow cylinder (6) and the bore in the second coupling half (5) is arranged substantially parallel to the axis of rotation of the drive shaft or output shaft (2, 3).

8. Coupling according to claim 1,
in which the form of the knurling (7, 9) on the lateral surfaces of the first hollow cylinder (6) and the bore in the second coupling half (5) is arranged at an angle between 0° and 90° to the axis of rotation of the drive shaft or output shaft (2, 3).

9. Coupling according to claim 1,
in which the second coupling half (5) and the two hollow cylinders (6, 8) have a form fitting and force locking contact or a form fitting and material bonded contact or a form fitting, force locking and material bonded contact with each other and with the inner lateral surface of the bore.

10. Coupling according to claim 1,
in which the knurling 7, 9) at least over the entire circumference of the inner and outer lateral surface of the first hollow cylinder (6) and inner lateral surface of the bore of the second coupling half (5) is present partly or entirely over the entire height of the second hollow cylinder (8) and the bore.

11. Coupling according to claim 1,
in which the knurling (7, 9) is uniform on at least one lateral surface.

12. Coupling according to claim 1,
in which the inner lateral surface of the first hollow cylinder (6) corresponds to the shape of the outer lateral surface of the drive shaft or output shaft (2, 3) and all other lateral surfaces of the first and second hollow cylinder (6, 8) and the bore respectively correspond at least to the shape of the lateral surfaces in contact with them in order to create a force locking, form fitting or material bonded connection.

13. Coupling according to claim 1,
in which the outer lateral surface of the first hollow cylinder (6), the inner and/or outer lateral surface of the second hollow cylinder (8) and the inner lateral surface of the bore have a conical or stepped shape and/or the diameter of the hollow cylinders (6, 8) and/or of the bore is the same or different along its length and the diameter is round, ellipsoidal or polygonal and/or the end faces of the second hollow cylinder (8) end at the end faces and/or the lateral surfaces of the first hollow cylinder (6) and second coupling half (5) with the bore and realize the electrical insulation of the first hollow cylinder (6) and second coupling half (5).

14. Method for producing a coupling (1) for rail vehicle drives,
in which at least two coupling halves (4, 5) are produced and at least the second coupling half (5 is made at least from two hollow cylinders (6, 8) arranged above one another,
wherein at first the first hollow cylinder (6) and the second coupling half (5) are produced from an electrically conductive material, then a bore is introduced into the second coupling half (5), realizing a substantially parallel arrangement of the second coupling half (5) to the axis of rotation of a drive shaft or an output shaft (2, 3), at least the outer lateral surface of the first hollow cylinder (6) and the inner lateral surface of the bore in the second coupling (5) half are provided with a knurling (7), and then the second hollow cylinder (8) made of an electrically insulating material is introduced into the space between the first hollow cylinder (6) and the bore in the second coupling half (5) with substantially complete and at least form fitting contact.

15. Method according to claim 14,
in which the knurling (7, 9) is introduced in the second coupling half (5) by means of knurling, pressing, thread cutting, lathe turning, milling or embossing on the lateral surfaces of the first hollow cylinder (6) and the second coupling half (5).

16. Method according to claim 14,
in which the electrically insulating material of the second hollow cylinder (8) is introduced in a solid, pastelike, liquid or molten form.

17. Method according to claim 14,
in which a polymer material is introduced as the electrically insulating material of the second hollow cylinder (8).

18. Method according to claim 14,
in which the material of the second hollow cylinder (8) is press-fitted or injected into the space between the second hollow cylinder (8) and the bore in the second coupling half (5).

* * * * *